US012718484B2

(12) United States Patent
Weinmann et al.

(10) Patent No.: US 12,718,484 B2
(45) Date of Patent: Aug. 25, 2026

(54) INFERRING MISSING DETAILS OF A POINT CLOUD RENDERING

(71) Applicant: DASSAULT SYSTEMES DEUTSCHLAND GMBH, Stuttgart (DE)

(72) Inventors: Andreas Weinmann, Munich (DE); Holger Dammertz, Munich (DE)

(73) Assignee: DASSAULT SYSTEMES DEUTSCHLAND GMBH, Stuttgart (DE)

( * ) Notice: Subject to any disclaimer, the term of this patent is extended or adjusted under 35 U.S.C. 154(b) by 251 days.

(21) Appl. No.: 18/502,818

(22) Filed: Nov. 6, 2023

(65) Prior Publication Data

US 2024/0153212 A1 May 9, 2024

(30) Foreign Application Priority Data

Nov. 4, 2022 (EP) .................................... 22306673

(51) Int. Cl.

| | |
|---|---|
| ***G06T 17/20*** | (2006.01) |
| ***G06V 10/56*** | (2022.01) |
| ***H04N 13/275*** | (2018.01) |

(52) U.S. Cl.

CPC .............. *G06T 17/20* (2013.01); *G06V 10/56* (2022.01); *H04N 13/275* (2018.05)

(58) Field of Classification Search

None

See application file for complete search history.

(56) References Cited

U.S. PATENT DOCUMENTS 10,559,121 B1 * 2/2020 Moudgil ................. G06T 15/50
11,748,940 B1 * 9/2023 Xian ..................... G06T 15/205
345/419

(Continued)

FOREIGN PATENT DOCUMENTS

CN 114565738 A 5/2022

OTHER PUBLICATIONS

Extended European Search Report issued Apr. 17, 2023, in European Patent Application No. 22306673.9, citing documents 3 and 16-20, therein, 12 pages.

(Continued)

*Primary Examiner* — Sultana M Zalalee

(74) *Attorney, Agent, or Firm* — Oblon, McClelland, Maier & Neustadt, L.L.P.

(57) ABSTRACT

This disclosure notably relates to a computer-implemented method for forming a dataset configured for learning a neural network architecture configured for inferring missing image details of a point cloud rendering. The method comprises the steps of obtaining a 3D mesh scene, computing a point cloud representation of the 3D mesh scene, generating one or more camera views of the 3D mesh scene and the point cloud representation. For each camera view, the method renders a viewpoint of the point cloud representation, of the 3D mesh scene, computes another point cloud representation of the viewpoint of the 3D mesh scene, and renders a viewpoint of the other point cloud representation. The method also comprises obtaining a pair of training samples, each comprising respectively the rendered viewpoint of the point cloud representation and the rendered viewpoint of the other point cloud representation; and adding the pair of training samples to the dataset.

20 Claims, 14 Drawing Sheets

(56) References Cited

U.S. PATENT DOCUMENTS

| | | | | |
|---|---|---|---|---|
| 2015/0381968 | A1* | 12/2015 | Arora | G06T 17/00 348/47 |
| 2017/0148199 | A1* | 5/2017 | Holzer | G06F 16/738 |
| 2020/0057831 | A1* | 2/2020 | Wu | G06T 7/70 |
| 2020/0074016 | A1* | 3/2020 | Chong | G06F 30/00 |
| 2021/0142497 | A1* | 5/2021 | Pugh | G06T 7/543 |
| 2022/0019852 | A1* | 1/2022 | Eyjolfsdottir | G06N 3/045 |
| 2023/0094308 | A1* | 3/2023 | Yang | G06V 10/7792 382/154 |
| 2023/0136766 | A1* | 5/2023 | Knuffman | G06N 3/0475 345/419 |
| 2025/0111533 | A1* | 4/2025 | Yu | G06T 7/73 |

OTHER PUBLICATIONS

Bui, G., et al., "Point-based rendering enhancement via deep learning", The Visual Computer: International Journal of Computer Graphics, 2018, pp. 829-841.
Gatys, L.A., et al., "A Neural Algorithm of Artistic Style", https://arxiv.org/abs/1508.06576, 2015, pp. 1-16.
Griffiths, D., et al., "SynthCity: A Large Scale Synthetic Point Cloud", CoRR, 2019, pp. 1-6.
Lecunn, Y., et al., "Gradient-Based Learning Applied to Document Recognition", http://vision.stanford.edu/cs598_spring07/papers/Lecun98.pdf, 1998, 46 total pages.
Li, Z., et al., "A Survey of Convolutional Neural Networks: Analysis, Applications, and Prospects", https://arxiv.org/abs/2004.02806, 2020, pp. 1-21.
Liu, G., et al., "Image Inpainting for Irregular Holes Using Partial Convolutions", https://arxiv.org/abs/1804.07723, 2018, 23 total pages.
Simonyan, K., et al., "Very Deep Convolutional Networks for Large-Scale Image Recognition", https://arxiv.org/abs/1409.1556, 2015, pp. 1-14.
Vincent, P., et al., "Extracting and Composing Robust Features with Denoising Autoencoders", https://www.cs.toronto.edu/~larocheh/publications/lcml-2008-denoising-autoencoders.pdf, 2008, 8 total pages.
Zhang, R., et al., "The Unreasonable Effectiveness of Deep Features as a Perceptual Metric", https://arxiv.org/1801.03924, 2018, pp. 1-14.
Javaheri, A., et al., "Point Cloud Rendering After Coding: Impacts on Subjective and Objective Quality", IEEE Transactions on Multimedia, vol. 23, https://arxiv.org/ftp/arxiv/papers/1912/1912.09137.pdf, 2019, pp. 4049-4064.
Xia, Y., et al., "VPC-Net: Completion of 3D Vehicles from MLS Point Clouds", ArXiv, abs/2008.03404, 2020, pp. 1-22.
Liu, M., et al., "Morphing and Sampling Network for Dense Point Cloud Completion", AAAI Conference on Artificial Intelligence, 2019, 9 total pages.
Wu, H., et al., "Cross-Regional Attention Network for Point Cloud Completion", 2020 25th International Conference on Pattern Recognition (ICPR), 2021, pp. 10274-10280.
Mendoza, A., et al., "Refinement of Predicted Missing Parts Enhance Point Cloud Completion", ArXiv, abs/2010.04278, 2020, pp. 1-11.
Huang, Z., et al., "Surface Reconstruction from Point Clouds: A Survey and a Benchmark", ArXiv, abs/2205.02413, 2022, pp. 1-27.

* cited by examiner

100

200

210

INFERRING MISSING DETAILS OF A POINT CLOUD RENDERING

CROSS REFERENCE TO RELATED APPLICATIONS

This application claims priority under 35 U.S.C. § 119 or 365 to European Application No. 22306673.9, filed Nov. 4, 2022. The entire contents of the above application are incorporated herein by reference.

TECHNICAL FIELD

The disclosure relates to the field of computer programs and systems, and more specifically to a method, system and program for forming a dataset configured for learning a neural network architecture and to a method of use of the dataset.

BACKGROUND

Point Clouds are widely used to create virtual representation of real world scenes. Those representations may be obtained from scans from real world scenes (e.g., obtained by a depth sensor) and are used to analyze and plan operations in the real world. However, point clouds may be irregular, noisy or incomplete due to acquisition artifacts. For example, point clouds obtained from scans are inherently sparse in their representation due to the resolution of the scanning process. This causes the virtual representation to lack information when navigation through the scene. Within this context, point-cloud enhancing techniques have been gaining more and more attention.

Some existing approaches increase the point size of each rendered point in the point cloud to get a denser representation of the scene. However, this approach introduces artifacts on the representation.

FIG. 1 illustrates a point cloud rendering 100 where point cloud data was obtained from a scan.

FIG. 2 illustrates a rendering 200, where the rendering increases the point size of the point cloud rendering on the point cloud rendering 100. The point size is five times larger than the original point size of the rendering of FIG. 1. Increasing the point size improves the recognition of some elements such as the metal portion 210 on the floor. However the increase on point size adds some artifacts. To illustrate this, FIG. 3 shows a zoomed portion 300 of the rendering 200 with increasing point sizes (310-340). The increase in point size allows to better discern the stairs, however the resulting shape becomes more irregular, due to the presence of outlier points that deform the shape of the stairs.

In addition, deep learning approaches have also been proposed for enhancing point-clouds, e.g., as in Bui, G., Le, T., Morago, B., & Duan, Y., "*Point-based rendering enhancement via deep learning*", 2018. However, existing approaches cause the inference to be slow, thereby precluding its usability in interactive scenarios.

Within this context, there is still a need for an improved method for inferring missing image details of a point cloud rendering.

SUMMARY

It is therefore provided a computer-implemented method for forming a dataset configured for learning a neural network architecture. The neural network architecture is configured for inferring missing image details of a point cloud rendering. The method comprising the step of obtaining a 3D mesh scene. The method also comprises the step of computing a point cloud representation of the 3D mesh scene. The method also comprises the step of generating one or more camera views of the 3D mesh scene and the point cloud representation. For each camera view, the method renders a viewpoint of the point cloud representation, thereby obtaining an image together with a corresponding depth map. The method also renders a viewpoint of the 3D mesh scene. The method also computes another point cloud representation of the viewpoint of the 3D mesh scene. The method also renders a viewpoint of the other point cloud representation, thereby obtaining another image together with another corresponding depth map. The method also comprises the step of obtaining a pair of training samples, each training sample comprising respectively the rendered viewpoint of the point cloud representation and the rendered viewpoint of the other point cloud representation. The method also comprises the step of adding the pair of training samples to the dataset.

The method may comprise one or more of the following:

- computing the point cloud representation comprises placing randomly one or more cube maps in the 3D scene mesh, and sampling a plurality of points of the 3D scene mesh from each of the one or more cube maps;
- computing the point cloud representation comprises combining the points sampled from of each respective cube map;
- the 3D mesh is an interior scene, and rendering the viewpoint of the other point cloud representation comprises, for each camera view, placing a camera in a random place of a box bounding the other point cloud representation;
- the placing of the camera is constrained by a minimum distance to a point of the other point cloud representation which is closest to the camera, and a maximum distance to any other point of the other point cloud representation;
- the 3D mesh scene is an exterior scene, and rendering the viewpoint of the other point cloud representation comprises, for each camera view, placing a camera on a random point on a sphere bounding the other point cloud representation;
- the 3D mesh scene is a mixed scene, and rendering the viewpoint of the other point cloud representation comprises, for each camera view, placing randomly a camera in a bounding box, the placing being constrained by a minimum distance to a point of the other point cloud representation which is closest to the camera, and a distance to a second point selected at random inside the bounding box;
- the obtained pair of training samples is added to the dataset if the number of visible points of the rendered viewpoint of the other point cloud representation is below a predetermined threshold;
- comprising computing, for each pair of training samples, combining different renderings using the depth information; and/or
- comprising applying to the pair of training samples one or more of augmentation techniques among color augmentation, horizontal and/or vertical flipping.

It is also provided a computer-implemented method of use of the dataset formed according to the method for forming the dataset. The method of use comprises learning a neural network architecture based on the dataset.

The method of use may comprise that the neural network architecture has N interconnected convolutional blocks having a respective resolution, each of the convolutional blocks being interconnected in increasing resolution, the method of use comprising providing an input image and N−1 down-sampled versions of the input image, the input image being provided to the interconnected convolutional block having the largest resolution, each down-sampled version being input to a respective convolutional blocks and having the same resolution as the respective resolution of the respective convolutional block.

It is further provided a computer program comprising instructions which, when the program is executed by a computer, cause the computer to carry out the method for forming the database and/or the method of use.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

Non-limiting examples will now be described in reference to the accompanying drawings, where.

DETAILED DESCRIPTION

Figure 1:
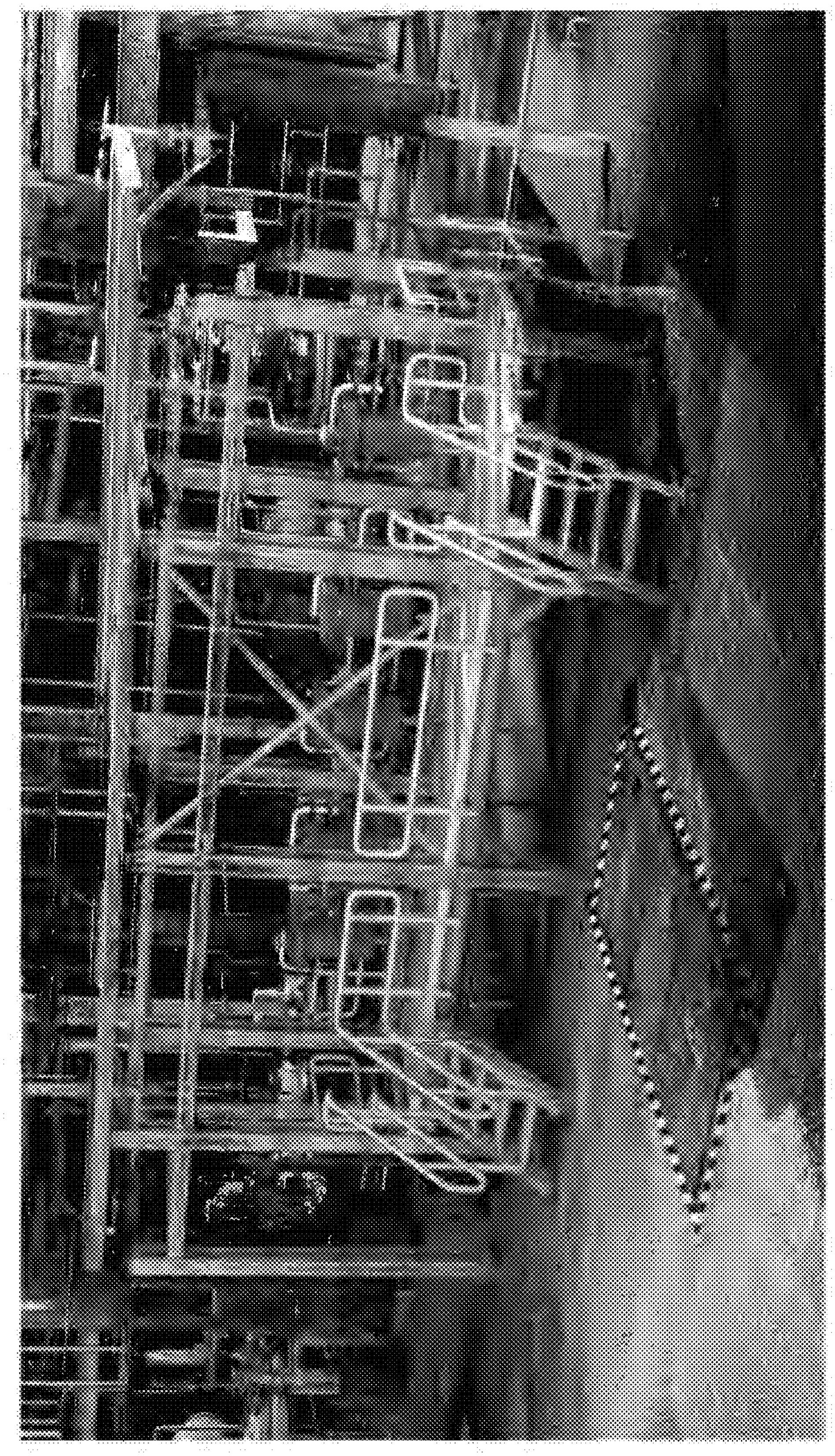
FIGS. 1 to 3 illustrates the prior art.
Figure 2:
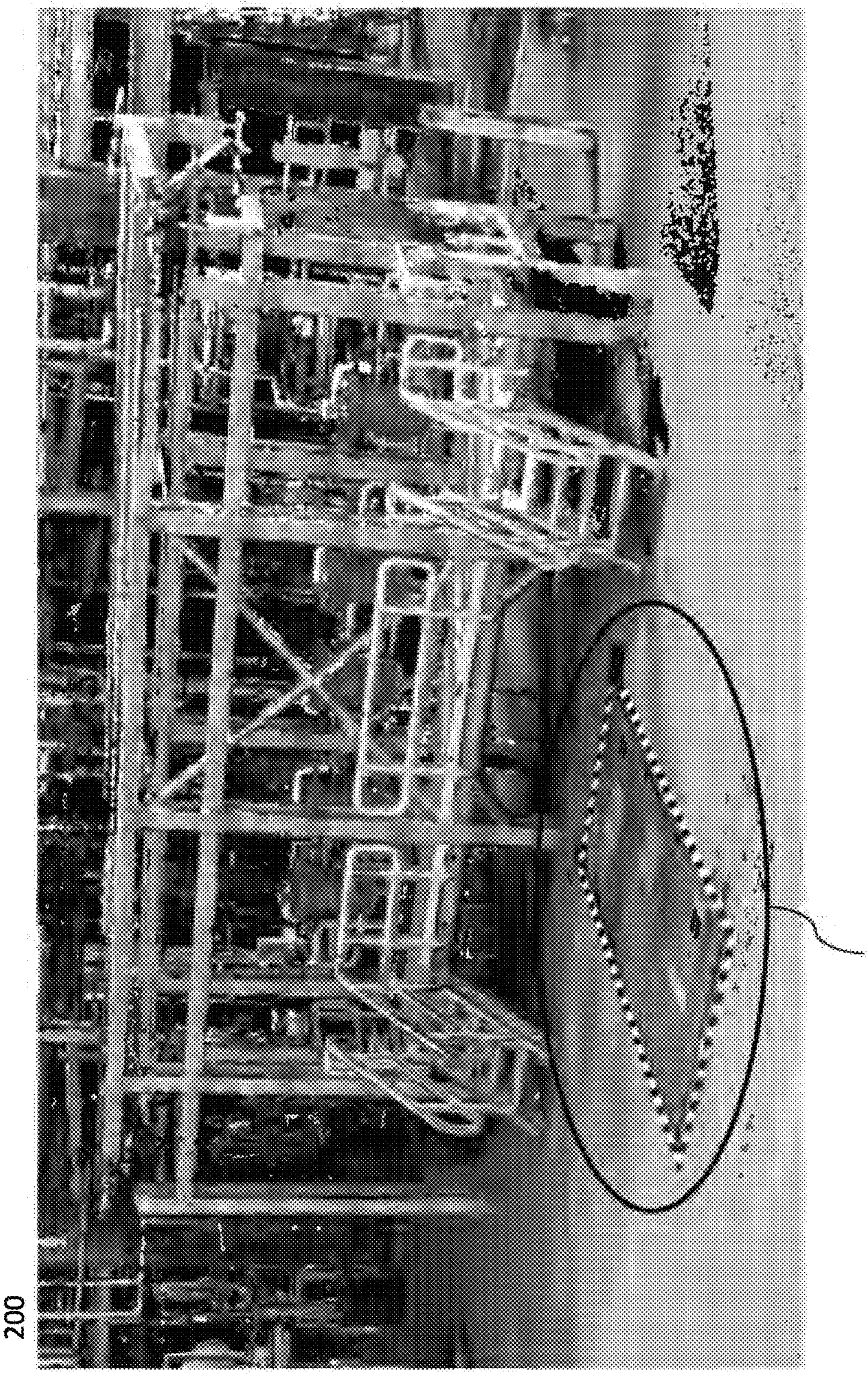
Figure 3:
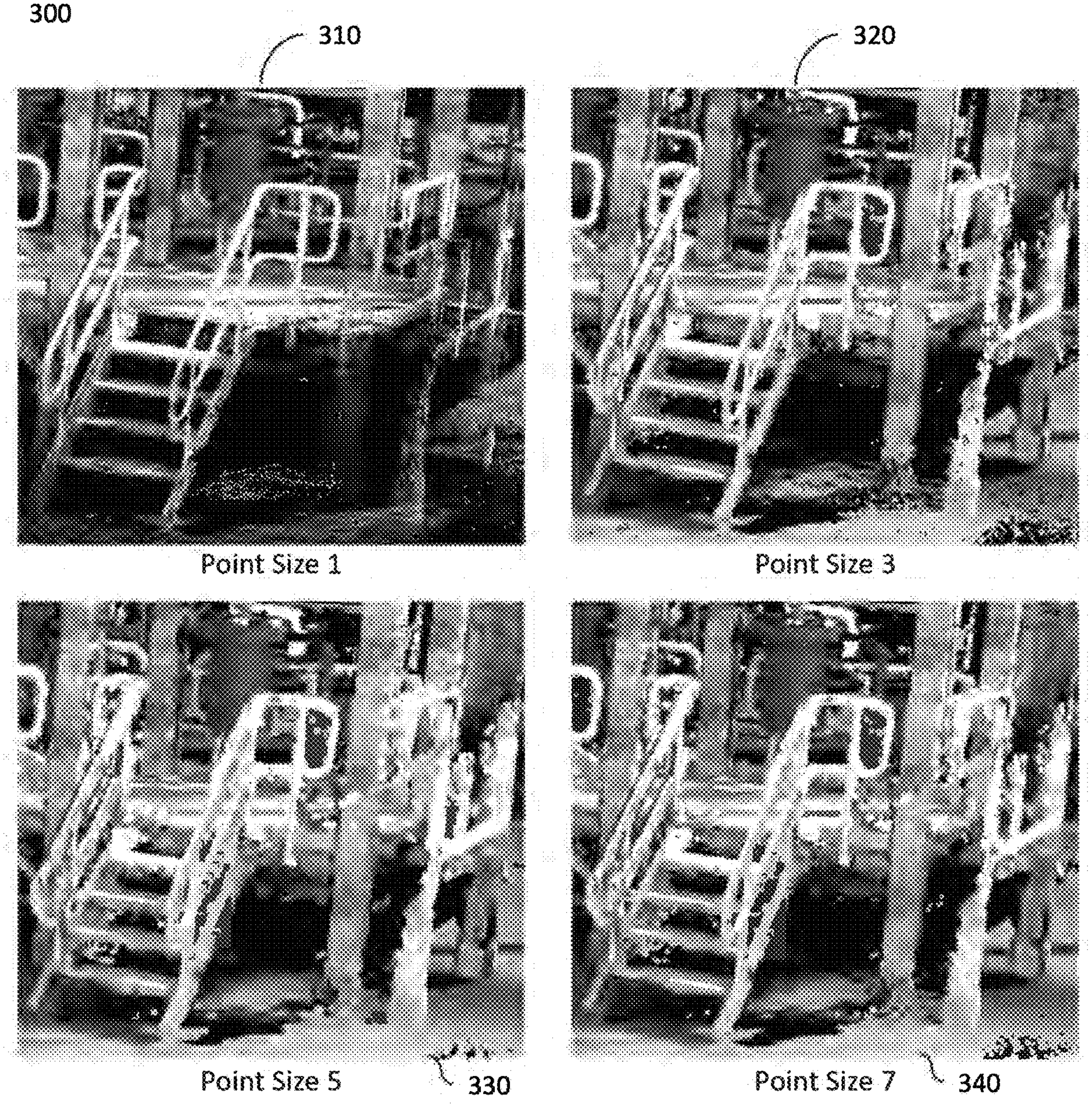
Figure 4:
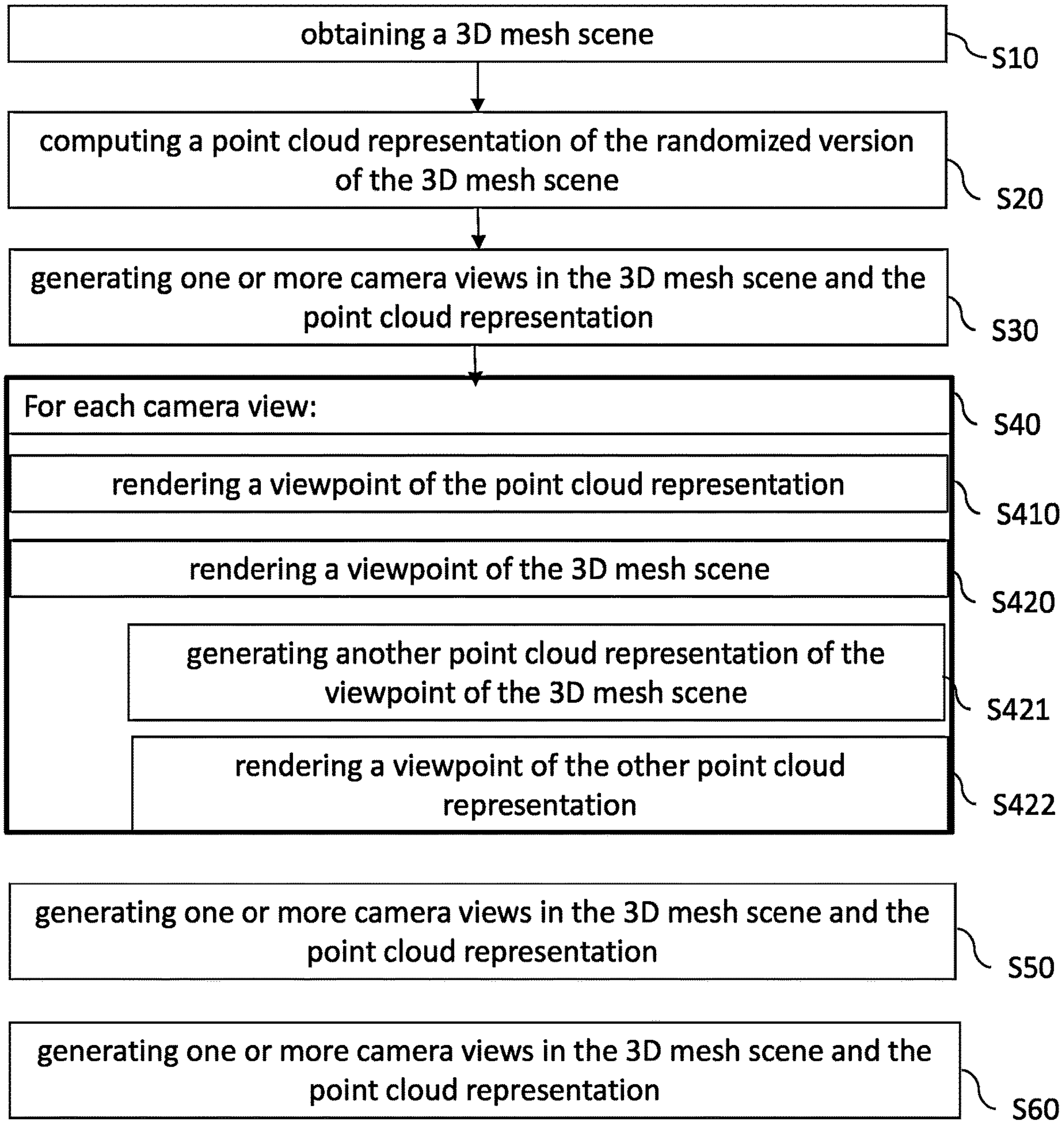
FIG. 4 shows an example of the method.

With reference to the flowchart of FIG. 4, there is described a computer-implemented method for forming a dataset configured for learning a neural network architecture. The neural network architecture is configured for inferring missing image details of a point cloud rendering.

The method comprises obtaining S10 a 3D mesh scene. The method also comprises computing S20 a point cloud representation of the 3D mesh scene. The method also comprises generating S30 one or more camera views of the 3D mesh scene and the point cloud representation.

The method also comprises for each camera view S40, rendering S410 a viewpoint of the point cloud representation. The method thereby obtains an image together with a corresponding depth map.

The method also renders S420 a viewpoint of the 3D mesh scene, computes S421 another point cloud representation of the viewpoint of the 3D mesh scene and renders S422 a viewpoint of the other point cloud representation. The method thereby obtains another image together with another corresponding depth map.

The method also obtains S50 a pair of training samples. Each training sample comprises respectively the rendered viewpoint of the point cloud representation and the rendered viewpoint of the other point cloud representation.

The method also adds S60 the pair of training samples to the dataset.

Such a method improves the inference of missing details of a point cloud. Indeed, one of the pair of training samples is the rendered viewpoint of the point cloud representation and thus provides training data with missing information; the other image is the rendered viewpoint of the other point cloud representation and by construction it provides a dense point cloud view, on the viewpoint of the 3D scene. The neural network architecture learns from the intended sparsity and the variability of points of view in the training data in order to infer missing information in the form of gaps, holes, sparse data points and/or field of view obstructions. This allows passing from a point cloud having relatively poor information to a more exploitable representation, i.e., a more complete point cloud with the inferred information that was missing from the original point cloud.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 5:
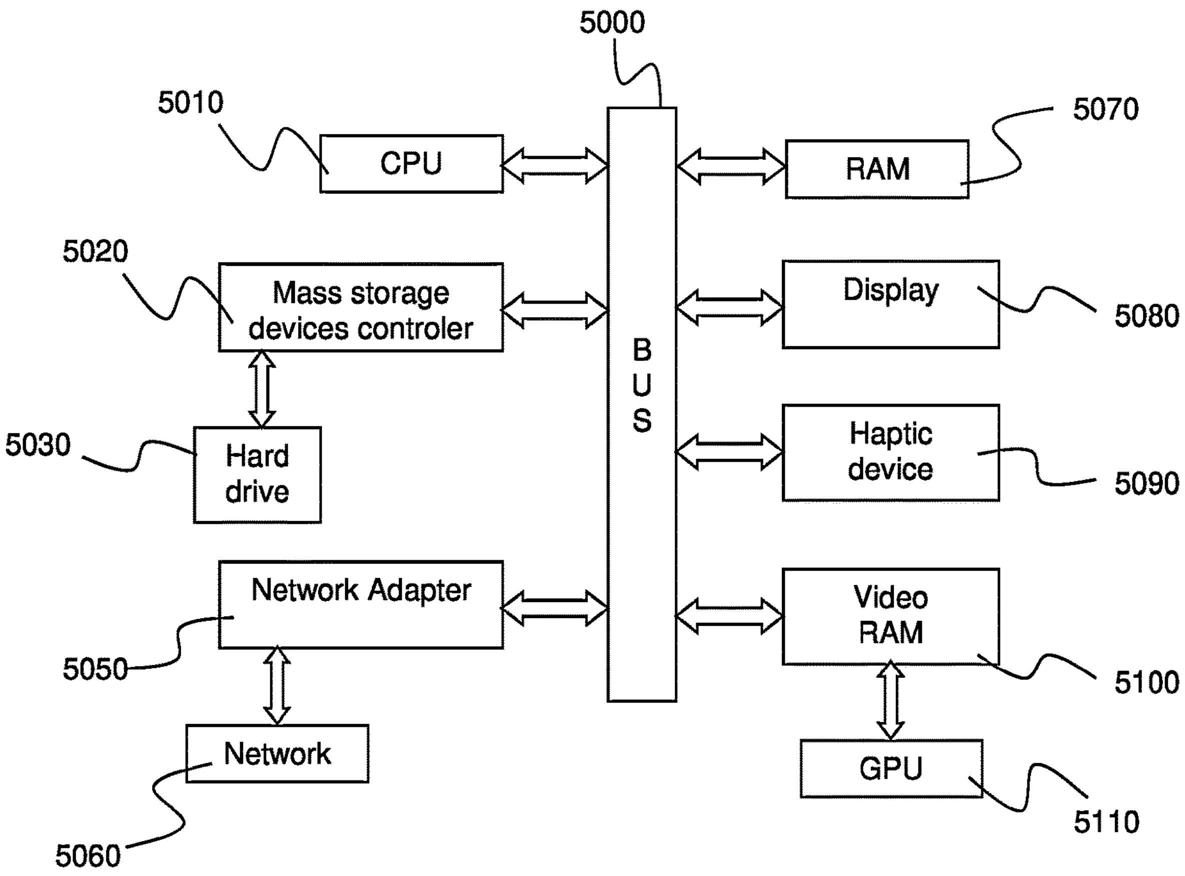
FIG. 5 shows an example of the system.

FIG. 5 shows an example of the system, wherein the system is a client computer system, e.g., a workstation of a user.

The client computer of the example comprises a central processing unit (CPU) 5010 connected to an internal communication BUS 5000, a random access memory (RAM) 5070 also connected to the BUS. The client computer is further provided with a graphical processing unit (GPU) 5110 which is associated with a video random access memory 5100 connected to the BUS. Video RAM 5100 is also known in the art as frame buffer. A mass storage device controller 5020 manages accesses to a mass memory device, such as hard drive 5030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks. Any of the foregoing may be supplemented by, or incorporated in, specially designed ASICs (application-specific integrated circuits). A network adapter 5050 manages accesses to a network 5060. The client computer may also include a haptic device 5090 such as cursor control device, a keyboard or the like. A cursor control device is used in the client computer to permit the user to selectively position a cursor at any desired location on display 5080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method. The computer program may alternatively be stored and executed on a server of a cloud computing environment, the server being in communication across a network with one or more clients. In such a case a processing unit executes the instructions comprised by the program, thereby causing the method to be performed on the cloud computing environment.

By "dataset", it is meant any data structure comprising training samples and configured for machine-learning, the data structure being recorded on memory of the computer system and accessible to the processor. The dataset-forming method may comprise recording the dataset on non-volatile memory.

As known per se from the field of machine-learning, a neural network architecture comprises a collection of interconnected nodes (also called "neurons"). Each neuron receives an input and outputs a result to other neurons connected to it.

The neurons and the connections linking each of them have weights, which are adjusted via a training. "Learning the neural network architecture" means adjusting at least one weight of a neuron or a connection linking at least two neurons.

In the case of the method, the neural network architecture is configured for inferring missing image details of a point cloud rendering. That is, the neural network architecture is configured to be provided with an input point cloud rendering (obtained, e.g., from a depth sensor or industrial scanner) and to infer missing detail, e.g., from the input point cloud rendering holes, gaps, invisible portions of an entity represented in the point cloud, infer outlier points. The neural network architecture may also be configured to output the inferred missing details. Thus, the ANN function allows to augment the input point cloud rendering with such information.

A 3D mesh scene is a 3D representation of a scene. The scene may represent the geometry of a real-world context (e.g., an industrial context in the case of a factory scene or urban context, such as in the case of an architectural scene) and comprise one or more entities. The one or more entities may be comprise one or more biological entities (such as humans and/or animals), and or other entities, such as (mechanical, electrical or hydraulic) parts. The one or more entities may be positioned in the scene according to a reference frame.

The 3D mesh scene may be obtained, at S10, by any type of data acquisition that allows the retrieval or obtention of the 3D mesh scene by the method. Obtaining S10 the 3D mesh scene may for example comprise downloading/retrieving (e.g., through a network) said 3D mesh scene from a (e.g., distant) memory or server or any non-volatile storage where these data have been stored.

The 3D mesh scene may include visualization parameters that set the rendering of the geometry of the 3D mesh scene according to the real-world setting it is supposed to represent. The visualization parameters may comprise, e.g., texture, material, color and/or luminosity parameters. The 3D mesh visualization parameters may be randomized, that is, each of the parameters may be chosen with a random rule.

The method computes, at S20, a point cloud representation of the 3D mesh scene. The point cloud representation may be a set of points in 3D space representing the scene. The point cloud representation may be generated from the 3D mesh scene in any manner known in the art, e.g., by sampling the set of (3D) points that intersect the elements of the 3D mesh scene. The sampling may be performed in any manner, e.g., each point may be separated by any predetermined distance, which determines the density of the point cloud. The points may be uniformly separated or non-uniformly separated, this is only a matter of implementation.

The method generates, at S30, one or more camera views of the 3D mesh scene and the point cloud representation. In other words, each camera view is generated on both of the 3D mesh scene and the point cloud representation. A camera view is a 2D projection of the 3D mesh scene at a given viewpoint. A viewpoint is a position in 3D space from which the 3D mesh scene is observed, e.g., from a viewing angle. The method generates one or more camera views, and thus may generate different viewpoints through the 3D mesh scene, e.g., at different positions or at least two equal viewpoints at the same position but with different viewing angles. For example, the method may set at least some (e.g., all) of the fixed points so as to bound the 3D mesh scene and/or may set at least some (e.g., all) of the fixed points near to entities of the 3D scene. At least some (e.g., all) of the fixed points may be set randomly.

Steps for the method performed for each camera view at S40 are now discussed.

The method renders, at S410, a viewpoint of the point cloud representation. That is, the method may obtain a 2D projection of the point cloud representation (e.g., as rendered by a point cloud renderer) from the viewpoint together with depth information from the point cloud, e.g., at least one point (for example, all) of the points of the set of points intersecting a respective entity of the scene, e.g., by taking into account the distance of the at least one point to the position of the viewpoint. The method thereby obtains an image (i.e., the 2D projection from the viewpoint) together with a corresponding depth map, e.g., a corresponding 2D matrix, each element of the matrix comprising depth information of a respective point of the point cloud representation with respect to the viewpoint (thus being projected in the image).

The method renders, at S420, a viewpoint of the 3D mesh scene. That is, the 3D mesh scene is rendered (e.g., via a 3D renderer/engine) from the viewpoint. The method thus renders the geometry of the entities in the scene so as to be displayable (e.g., on a display) to the user from the viewpoint. Thereby, the viewpoint of the 3D mesh scene may comprise entities which may be (e.g., completely or partly) visible or invisible from the viewpoint.

The method computes, at S421, another point cloud representation of the viewpoint of the 3D mesh scene. The method thus obtains a set of (3D) points from the 3D mesh scene as projected from the viewpoint of the 3D mesh scene.

The set of points may correspond to points that intersect elements of the 3D mesh scene that are (at least partly) visible from the viewpoint of the 3D mesh scene.

The method renders, at S422, a viewpoint of the other point cloud representation. The method thereby obtains another image (i.e., corresponding to another 2D projection of the point cloud with respect to the viewpoint) together with another corresponding depth map, that is, a corresponding matrix comprising depth information of the projected points of the point cloud with respect to the viewpoint.

The method obtains, at S50, a pair of training samples. Each training sample comprises respectively the rendered viewpoint of the point cloud representation (that is, the 2D projection of the cloud representation together with depth information from the point cloud) and the rendered viewpoint of the other point cloud representation (that is, the 2D projection of the cloud representation, respectively computed from the viewpoint of the 3D mesh scene, together with depth information from the point cloud).

The method adds, at S60, the pair of training samples to the dataset, e.g., by recording the pair of training sample on the data structure recorded in non-volatile memory.

It is further provided a method of use of the dataset. The method of used comprises learning the neural network architecture based on the dataset. As known per se from the field of machine learning, such a dataset may comprise a subset of data directed for configuring the neural network architecture to infer missing details of a point cloud rendering and a subset for testing (also "ground truth dataset") for evaluating if the inference by the neural network performs well. The subset of data directed for configuring the neural network architecture may comprise more training samples than the ground truth dataset, for example more than 60% of the total number of training samples (e.g., of the order of 80%). The total number of training samples depends on the contemplated quality of the learning This number may be higher than 100 or 1.000 training samples. In tested implementations, 5.000 training samples may yield a good compromise between the quality of the training for inferring missing details. 7.000 training samples also provide noticeable improvement. The number of training samples may also be of 10.000 training samples or more.

The neural network architecture is now discussed.

The neural network architecture may have N interconnected convolutional blocks. N is a natural number. Convolutional blocks are known in the art, a standard reference may be found in Lecun, Bottou, Bengio & Haffner, "*Gradient-based learning applied to document recognition*", 1998. Each convolutional block may have a respective resolution. Each of the N convolutional blocks may be interconnected in increasing resolution. For example, if N=2, i.e., the neural network architecture has 2 interconnected convolutional blocks, the first block may have a resolution r, and the second block may have a resolution s, where r>s.

The method of use may comprise providing an input image and N−1 down-sampled versions of the input image. The input image may be, e.g., a point cloud image having an original resolution or a color image with depth data, and the method provides N−1 images down sampled to a resolution lower than the original resolution. The input image may be provided to the interconnected convolutional block having the largest resolution. Each down-sampled version may be input to a respective convolutional block. Each down-sampled version may have the same resolution as the respective resolution of the respective convolutional block. For example, the method may down-sample the input image on the fly so as to match the resolution of the respective convolutional block. This is only a matter of implementation.

The method of use thus exploits the neural network architecture to improve the inference of missing detail on the input image. Thanks to the method of use inputting an input image and N−1 down-sampled versions, the method of use discriminates gaps (regions of the image without points, color or depth information) at each respective resolution, and compares it with the input image (of the original version) so that the neural network architecture focuses the inference of missing details on those regions. In addition, convolutional blocks allow for an implementation suitable for interactive processing; for example, tested implementation show that blocks run at 50 ms on standard graphical processing units for an input image having an original resolution of 1920×1080.

The method is thus able to improve the inference of missing image details of a point cloud rendering (e.g., gaps, holes, outlier points). Indeed, the method may provide realistic by adding the pairs of training samples are used to train a neural network that generalizes to real world data and allows to fill in missing information in real world scans (e.g., obtained from a depth sensor or scanner) allowing an enhanced and more realistic virtual representation of the real world scenes captured by the input point cloud representation.

In addition, thanks to the rendering of viewpoints made for each camera view at S410-S422, the method is able to generate realistic views of the scene, as the creation of the training pairs focuses on varying the visibility of elements of the 3D mesh scene. The rendered viewpoint of the point cloud representation may be a reference viewpoint for the neural network architecture, while the rendered viewpoint of the other point cloud representation may be a variation of the reference viewpoint, yet the set of point clouds may coincide (e.g., by aligning the rendered viewpoints). This guarantees the viewpoint variability improves the inference of missing details, especially when the viewpoint of the other point cloud representation comprises details missing from the reference viewpoint.

In addition, the method may improve the variability of the real world data that the 3D mesh scene is supposed to represent, as the 3D mesh scene may be rendered according to its real world setting. The method may thus tender the 3D mesh scene to take into account the real world setting by setting randomly its visualization parameters, such as texture, material, color and/or luminosity parameters. This yet improves variability of the training samples, as the method may render training samples which are not easily obtainable from real world data.

The computation of the point cloud representation at S20 is now discussed in more details.

Computing the point cloud representation, at S20, may comprise placing randomly one or more cube maps in the 3D scene mesh, that is, the cube maps are placed at random points of the 3D scene mesh. The placement may be performed uniformly, or non-uniformly, and according to any random rule. A respective cube map (of the one or more cube maps) is a closed shape comprising six contiguous fields of view of the 3D mesh scene and representing each a cube map face, thereby being defined by a 90 degree angle between contiguous faces. As the respective cube map is a closed shape, the respective cube map allows a 360 degree view of the 3D scene mesh from the position at which the respective cube map is placed. The computation may also comprise sampling a plurality of points (also called "sample points") of the 3D scene mesh from each of the one or more cube maps. The method may sample, for each respective cube map of the one or more cube maps, the plurality of points according to any sampling density. The method may sample the plurality of points independently for each respective cube map; for example, the method may sample 100 sample points from a first cube map and 200 (or more) sample points from a second cube map. Alternatively, the method may sample the same number of sample points for each respective cube map. The method may compute the point cloud representation from sample points of each of the one or more cube maps.

This results in that the method improves the variability of the training samples. Indeed, as the method samples the points from each cube map, constrains the sampling of the point cloud representation to the field of views of the cube map. Thereby, the point cloud representation may present holes, e.g., as regions of 3D space where the fields of view of at least two cube maps do not intersect. A neural network architecture may learn from this variation, and thus learn to infer gaps from a point cloud.

Computing (S20) the point cloud representation may comprise combining the points sampled from of each respective cube map. For example, the point cloud representation may be computed from the union of the plurality of sample points of each of the one or more cube maps. Thereby, the point cloud representation may present connected regions of points sampling the 3D mesh scene, which learn the network architecture to detect dense set points from the combination of points.

The 3D mesh may be an interior scene. An interior scene is a scene inside a premise in various and unlimited industrial fields, including: aerospace, architecture, construction, transportation, marine, and/or offshore oil/gas production or transportation. The premise may be, for example, a building, factory, a terrestrial vehicle, an aerial vehicle, a naval vehicle or airplane in any of those fields. Such premises may comprise one or more entities, such as (one or more) parts of a terrestrial vehicle (including e.g., car and light truck equipment, racing cars, motorcycles, truck and motor equipment, trucks and buses, trains), (one or more) parts of an aerial vehicle (including e.g., airframe equipment, aerospace equipment, propulsion equipment, defense products, airline equipment, space equipment), (one or more) parts of a naval vehicle (including e.g., navy equipment, commercial ships, offshore equipment, yachts and workboats, marine equipment), (one or more) general mechanical parts (including e.g., industrial manufacturing machinery, heavy mobile machinery or equipment, installed equipment, industrial equipment product, fabricated metal product, tire manufacturing product), (one or more) electro-mechanical or electronic parts (including e.g., consumer electronics, security and/or control and/or instrumentation products, computing and communication equipment, semiconductors, medical devices and equipment), (one or more) consumer goods (including e.g., furniture, home and garden products, leisure goods, fashion products, hard goods retailers' products, soft goods retailers' products), a packaging (including e.g., food and beverage and tobacco, beauty and personal care, household product packaging).

Rendering the viewpoint of the other point cloud representation may comprise, for each camera view, placing a camera in a random place of a box bounding the other point cloud representation. The box may be any graphical representation of a cube (represented by 3D coordinates) that encloses the set of points of the other point cloud representation. The box may be determined in any manner, e.g., the smallest cube enclosing the set of points of the other point cloud representation. A camera may be any function supported by, e.g., a 3D graphics renderer, that enables capturing a field of view of the other point cloud representation. The camera may be created in any manner, e.g., at a given place of the box and/or orientation in 3D space. The camera may be placed in a random place of a box bounding the other point cloud representation, that is, at any random place inside or at the boundary of the box. The method may render the viewpoint from the field of view captured by the camera.

The method thus improves the realism of the variability of views of training samples added to the dataset. Indeed, the box constrains the placement of the camera, and thus the camera may capture a field of view that captures the interior or exterior of the premise and any entity found on the premise.

The placing of the camera may be further constrained. The placing may be constrained by a minimum distance to a point of the other point cloud representation which is closest to the camera. In other words, the method enforces that the placing of the camera respects the minimum distance to the point of the other representation which is closest to the camera. This allows placing the camera without obstructing any entity or portion of the premise of the 3D mesh scene intersected by the point. The method may also constrain the placing by a maximum distance to any other point of the other point cloud representation. The placing may set the orientation of the camera towards the point having the maximum distance. The method may compute the maximum distance by sampling points of the other point cloud representation bounded by a sphere (e.g., a unit sphere).

This further improves the realism of the variability of the views present in the dataset. Indeed, the method ensures that the generation of views do not obstruct an entity (for example, that the camera is not stuck inside of the entity), while providing an orientation that covers the largest possible field of view (as the method constrains the placing by the maximum distance).

The 3D mesh scene may be an exterior scene. An exterior scene is an outside scene which comprises one or more premises (as seen from the outside) and/or other entities, for example an urban scene or an architectural scene. Rendering the viewpoint of the other point cloud representation may comprise, for each camera view, placing a camera on a random point on a sphere bounding the other point cloud representation. The sphere may be determined by the method by any method, e.g., the sphere having a smallest volume enclosing the set of (all) points of the other point cloud representation. The placing may also orient the cameras towards the center of the sphere. This is particularly efficient for generating training samples corresponding to exterior scenes, as it allows to have the largest possible field of view of the exterior scene.

The 3D mesh scene may be a mixed scene. In other words, the mixed scene may comprise outside scenes and premises (which in turn may comprise one or more entities). Rendering the viewpoint of the other point cloud representation may comprise, for each camera view, placing randomly a camera in a bounding box. The bounding box may be a graphical representation of a cube enclosing the mixed scene. The placing (of the camera) may be constrained by a minimum distance to a point of the other point cloud representation which is closest to the camera. This allows placing the camera without obstructing any entity or portion of the premise of the mixed scene intersected by the point. The method may also constrain the placing by a distance to a second point selected at random inside the bounding box. Thereby, the method may determine the orientation of the camera by selecting the second point as a look-at-point. This allows the method to produce realistic views that contain valuable information about the mixed scene. Indeed, the selection of the second point produces a high variation with respect to the perspective of the views.

The method may add the obtained pair of training samples to the dataset if the number of visible points of the rendered viewpoint of the other point cloud representation is below a predetermined threshold. For example, the method may not add the obtained pair of training samples if the rendered viewpoint has less than 20% (or less) of visible points. This prevents views that contain only a small part of the 3D mesh scene. Thereby, the method ensures that the training samples posses relevant information.

The method may comprise computing, for each pair of training samples, combining different renderings using the depth information (provided in the depth map). The different renderings may be different training samples within the dataset or may be obtained from a storage, a network or other entities. As each of the pair of training samples comprise a corresponding depth map, the method may take this information into account so as to combine the different renderings (e.g., one or more renderings) with the training samples. This ensures that the method creates a new training sample that is consistent geometrically with the original pair of training samples. Thereby, the method allows to augment the size of the dataset due to combinatorial explosion.

The method may comprise applying to the pair of training samples one or more of augmentation techniques. An augmentation technique is any image processing technique known in the art that may be applied to the training samples. The method may apply augmentation techniques among color augmentation, horizontal and/or vertical flipping. By color augmentation techniques, the method may modify, e.g., hue, saturation, brightness and/or contrast of the training samples. The method thus further increases the variation of the training data.

Examples of the method are now discussed with reference to FIGS. 6 to 14.

It is now discussed an implementation of the method on a synthetic data generation system. The synthetic data generation system is used to obtain a high variety of point cloud scenes and respective ground truth renderings. It is also discussed a trained neural network architecture to predict missing information in real-world point cloud renderings.

1) The Synthetic Data Generation System

Figure 6:
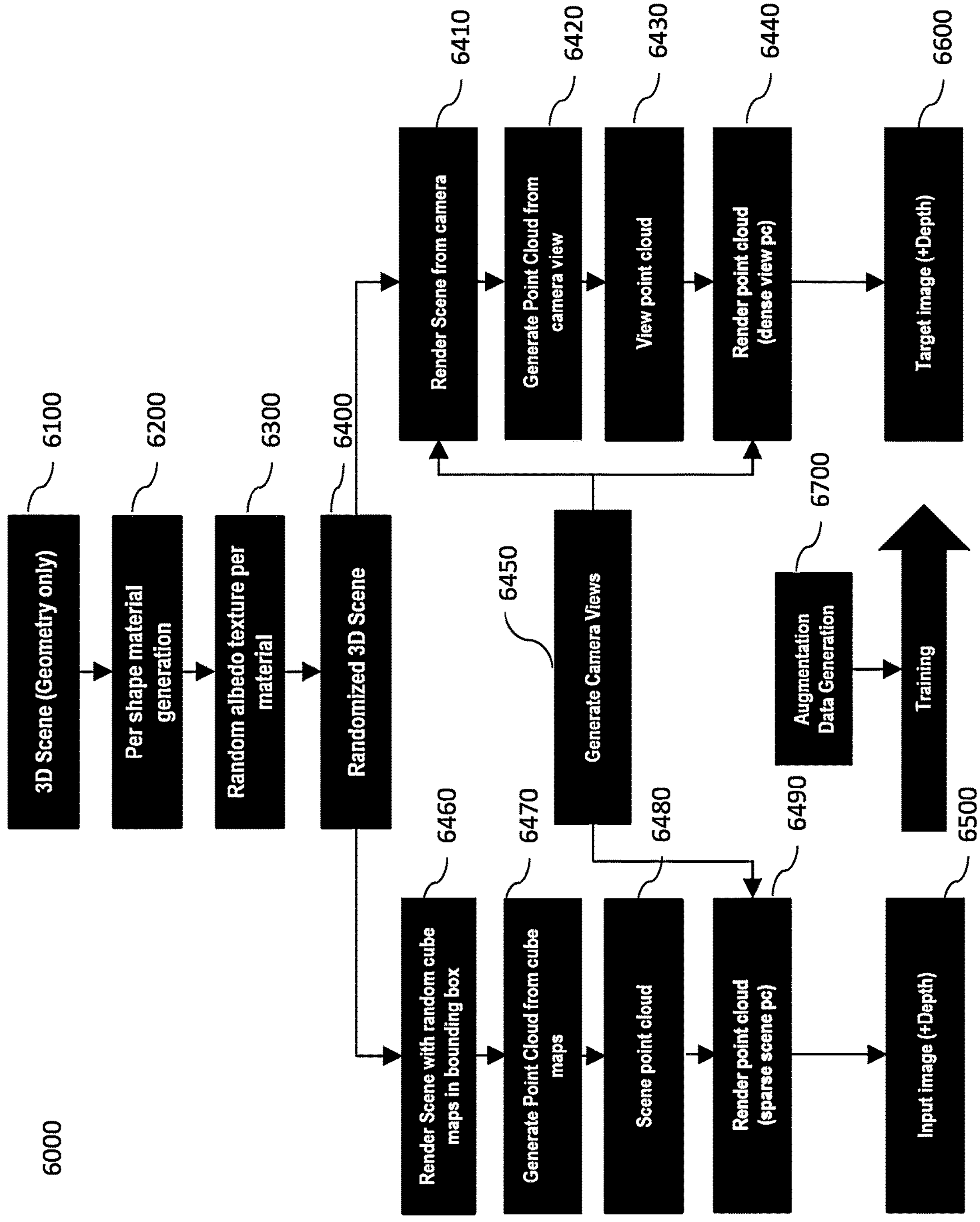
FIGS. 6, 7, 8, 9, 10, 11, 12, 13 and 14 illustrate the method.

Reference is made to FIG. 6, illustrating an overview of the synthetic data generation system 6000. The synthetic data generation system 6000 takes as input 6100 a 3D mesh scene. The 3D mesh scene contains only the geometry of the premises and/or entities. The synthetic data generation system 6000 generates shape materials 6200 to the 3D mesh scene. The synthetic data generation system 6000 applies the materials to each shape of the geometry. The synthetic data generation system 6000 next applies a random texture 6300 to each of the materials. The synthetic data generation system 6000 outputs 6400 a randomized 3D mesh scene containing a very diverse set of textures. The synthetic data generation system 6000 uses the 3D mesh scene output at 6400 to create a point cloud representation by using a 3D Mesh renderer.

The synthetic data generation system 6000 computes a box bounding the 3D mesh scene and generates a plurality of camera views 6450 at random positions inside the box. The camera views are used to render 360 degree cube map views 6460 in low resolution. The 3D mesh renderer is configured to render the color buffer as well as position buffer providing point samples of the 3D Scene. The synthetic data generation system 6000 renders a plurality of cube map views, and generates a point cloud from each cube map 6470. The synthetic data generation system 6000 combines the point samples of each view to construct a point cloud representation 6480 of the 3D mesh scene. The synthetic data generation system 6000 renders 6490 the point cloud representation. Optionally, to take into account for various point cloud resolutions found in real world scans, the synthetic data generation system 6000 may down sample the point cloud, e.g., removing a random part of the points. The rendered output representation (together with depth information) is added to the dataset as a training sample 6500.

Having a point cloud output at 6490 as well as a 3D mesh representation of the same scene generated at 6400 allows the system to generate views inside the scene and render those views with a point cloud renderer as well as a 3D mesh renderer. This produces sample image pairs consisting of a point cloud rendering with missing information due to the sparsity of the representation (input image) as well as the respective dense ground truth sample image produced by the 3D mesh renderer (target image). For generating high quality training data it is preferable that the reference image is processed the same way as the input image. This ensures that pixels that are visible in both images are exactly the same.

The 3D mesh renderer and the point cloud renderer are different complex components that contain various stages where processing of the input differs. Examples of those stages would be post processing pipelines or sampling algorithms. This causes pixels of the input image to not necessarily match the respective pixels in the target image. For some of those cases matching the configurations can solve this issue but in some cases it is not possible to adjust those stages. To take this into account, the synthetic data generation system 6000 renders 6410 the 3D mesh scene from the same camera view generated at 6450. Next, the synthetic data generation system 6000 generates 6420 point cloud from the camera view of the 3D mesh scene. The method next computes a viewpoint 6430 from the point cloud generated at 6420. The method next renders 6440 the point cloud from the viewpoint. The rendered viewpoint of the point cloud 6440 is perfectly dense, i.e., there is exactly one point for each pixel, with respect to the camera view of the reference rendering. The rendered viewpoint (along with depth information) is added to the dataset, linked (in the dataset) to the reference training sample added at 6500.

Figure 7:
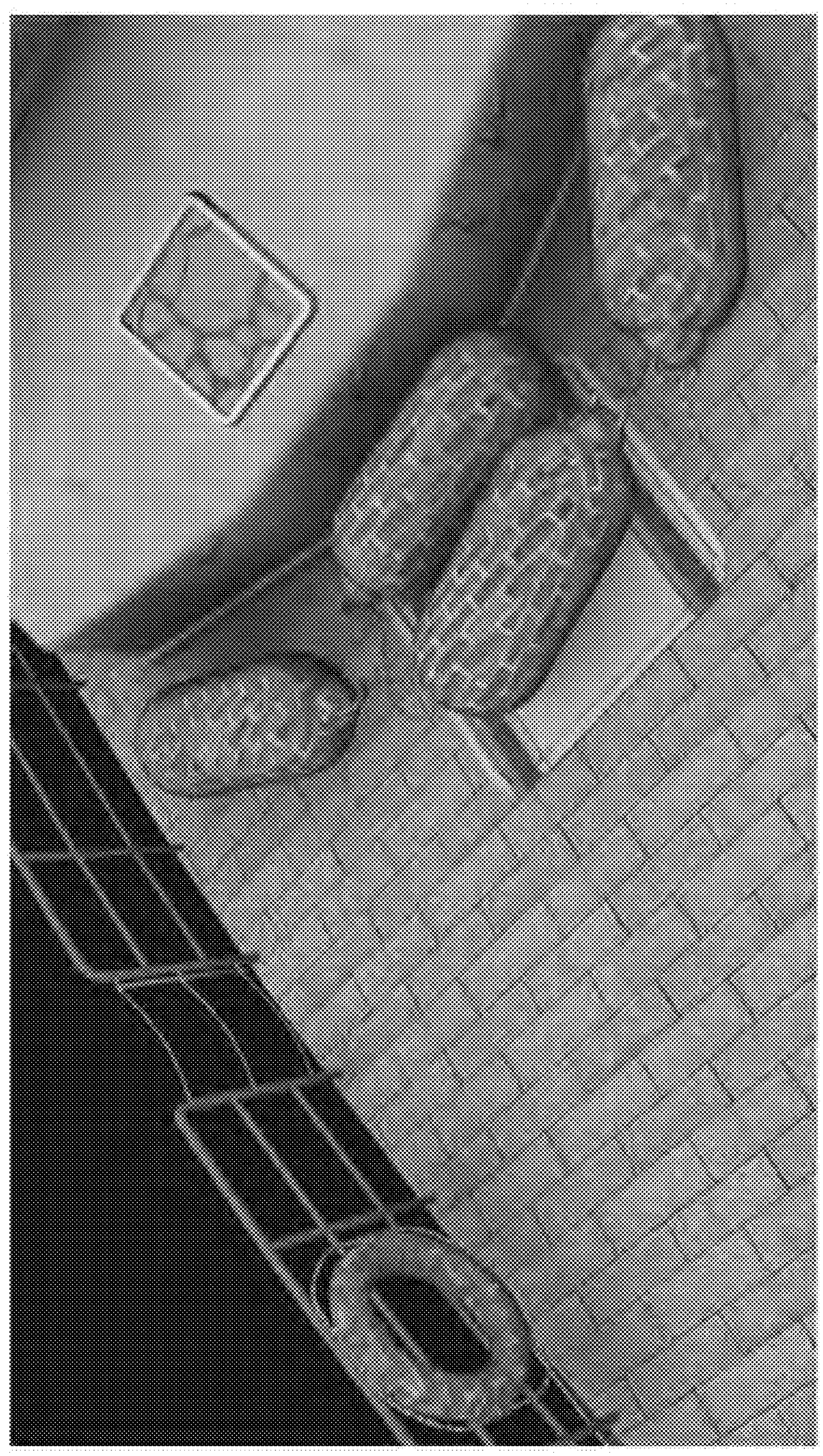
Figure 8:
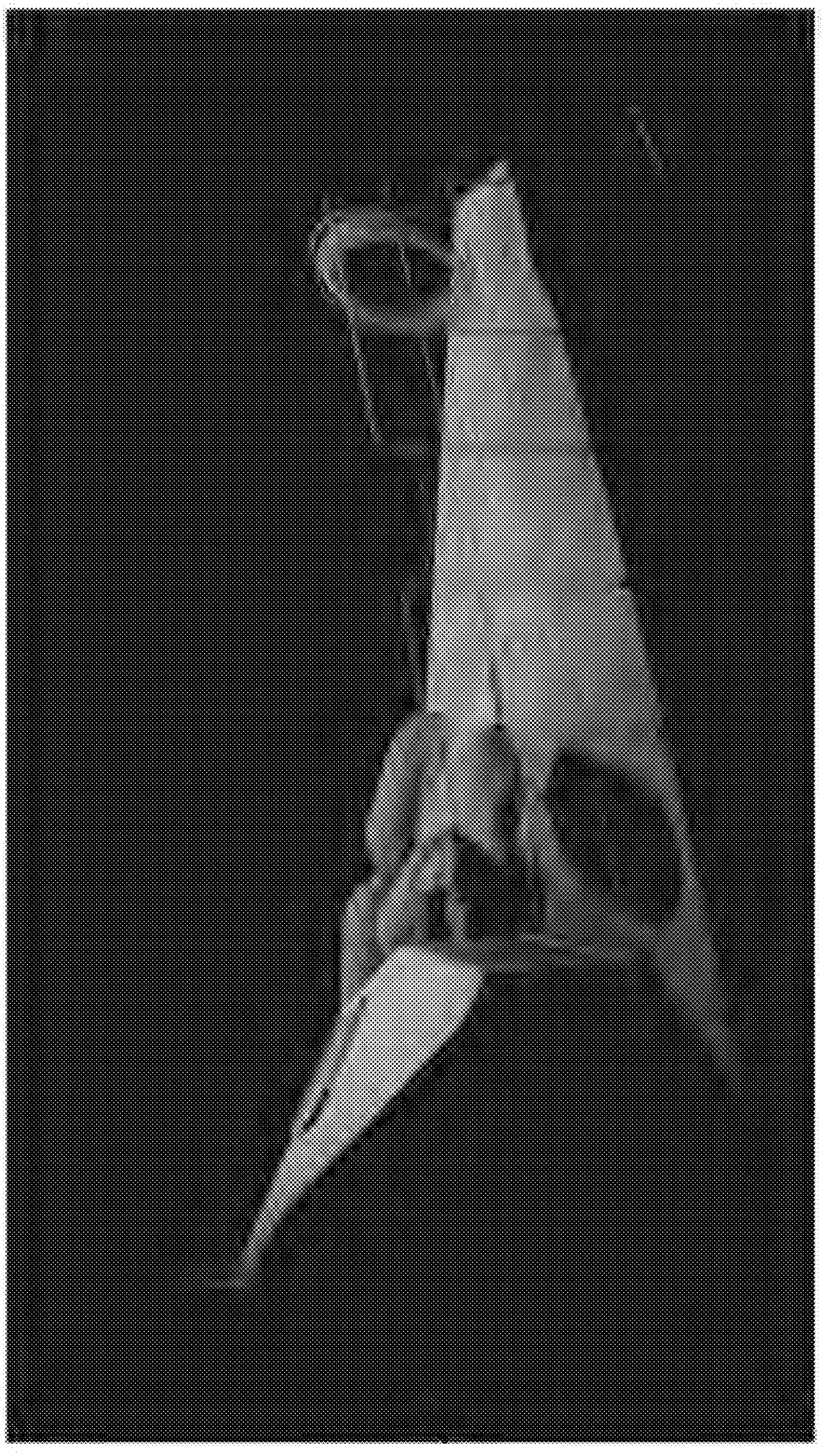

FIG. 7 illustrates a view of a point cloud rendering from the reference rendering. At this view, the point cloud is perfectly dense and thus represents accurately the geometry of the reference 3D mesh. FIG. 8 shows the same point cloud, but rendered from a different view. This process allows the synthetic data generation system 6000 to generate a reference image that is processed exactly the same way as the input image using the combination of a mesh and a point cloud renderer.

An additional benefit of the synthetic data generation system 6000 is the interchangeability of the rendering backend, allowing to change the mesh or point cloud renderer without changing the other or reconfigure the rendering stages.

The generation of camera views 6450 is now discussed.

To obtain realistic training samples of the scene, the synthetic data generation system 6000 uses the point cloud information for camera placement and orientation. The synthetic data generation system 6000 contains three ways to compute views depending on the scene type. For interior scenes the camera is randomly placed inside the scene bounding box constrained by having a minimum distance to the nearest point. This prevents the camera from being inside the scene geometry. After placing the camera we calculate the orientation by sampling points on a unit sphere around the camera and choose the point with the maximum distance to any other point in the point cloud using k nearest neighbors search.

For exterior scenes, the camera is placed on random points around the bounding sphere of the scene, oriented towards the center. For mixed scenes the camera is placed randomly inside the bounding box (again constrained by having a minimum distance to the nearest point) and the orientation of the camera view is calculated by selecting a second random point inside the bounding box which is used as the cameras look at point. This process produces realistic views that contain valuable information about the scene and have a high variation with respect to viewing perspective. To prevent views that contain only a small part of the scene, views with less than 20% visible points are discarded.

The synthetic data generation system allows to generate a dataset for training a neural network to predict the missing information of a real world point cloud rendering. Tested implementations have generated ~7000 training pairs containing color and depth values.

Figure 9:
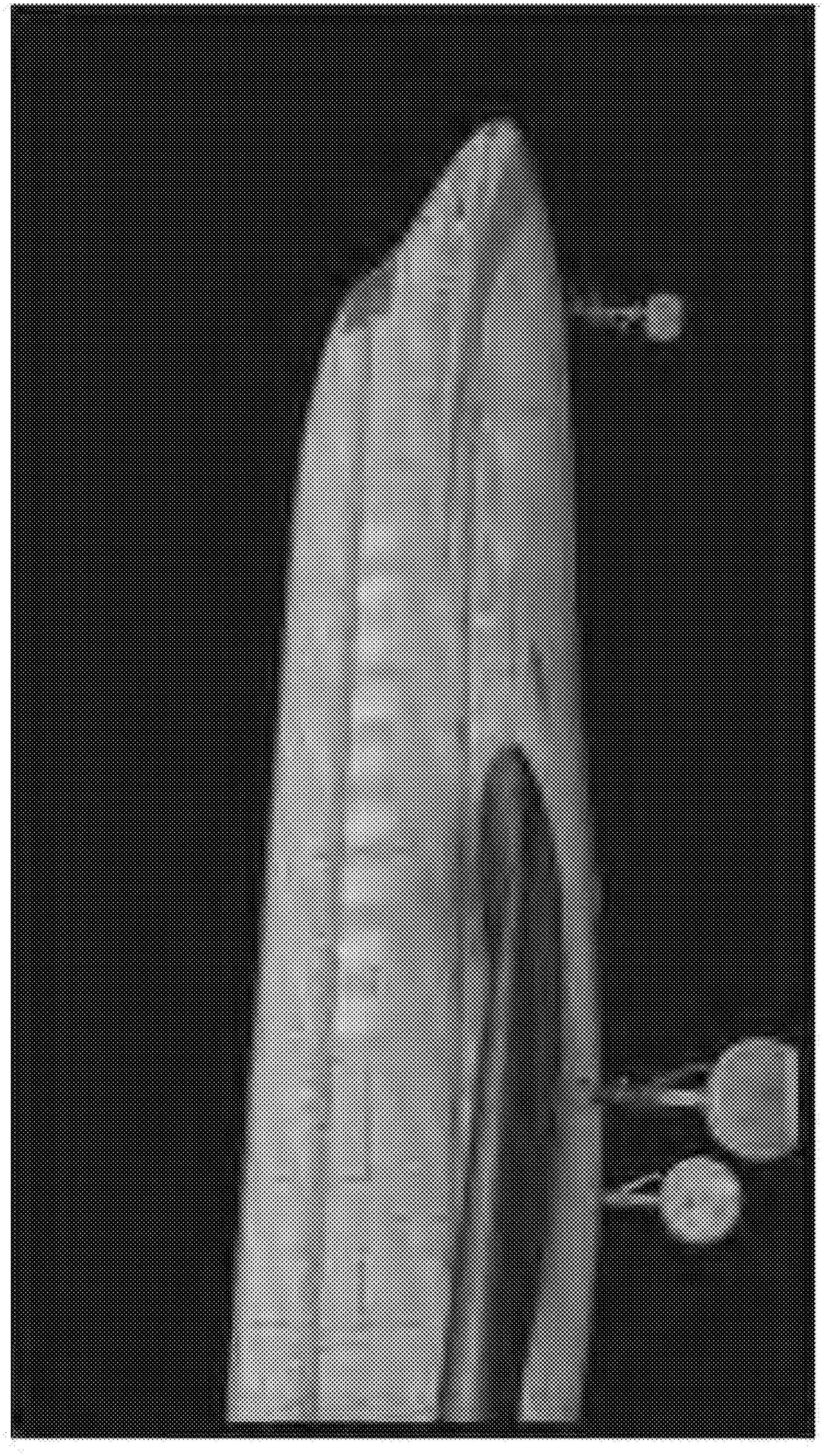
Figure 10:
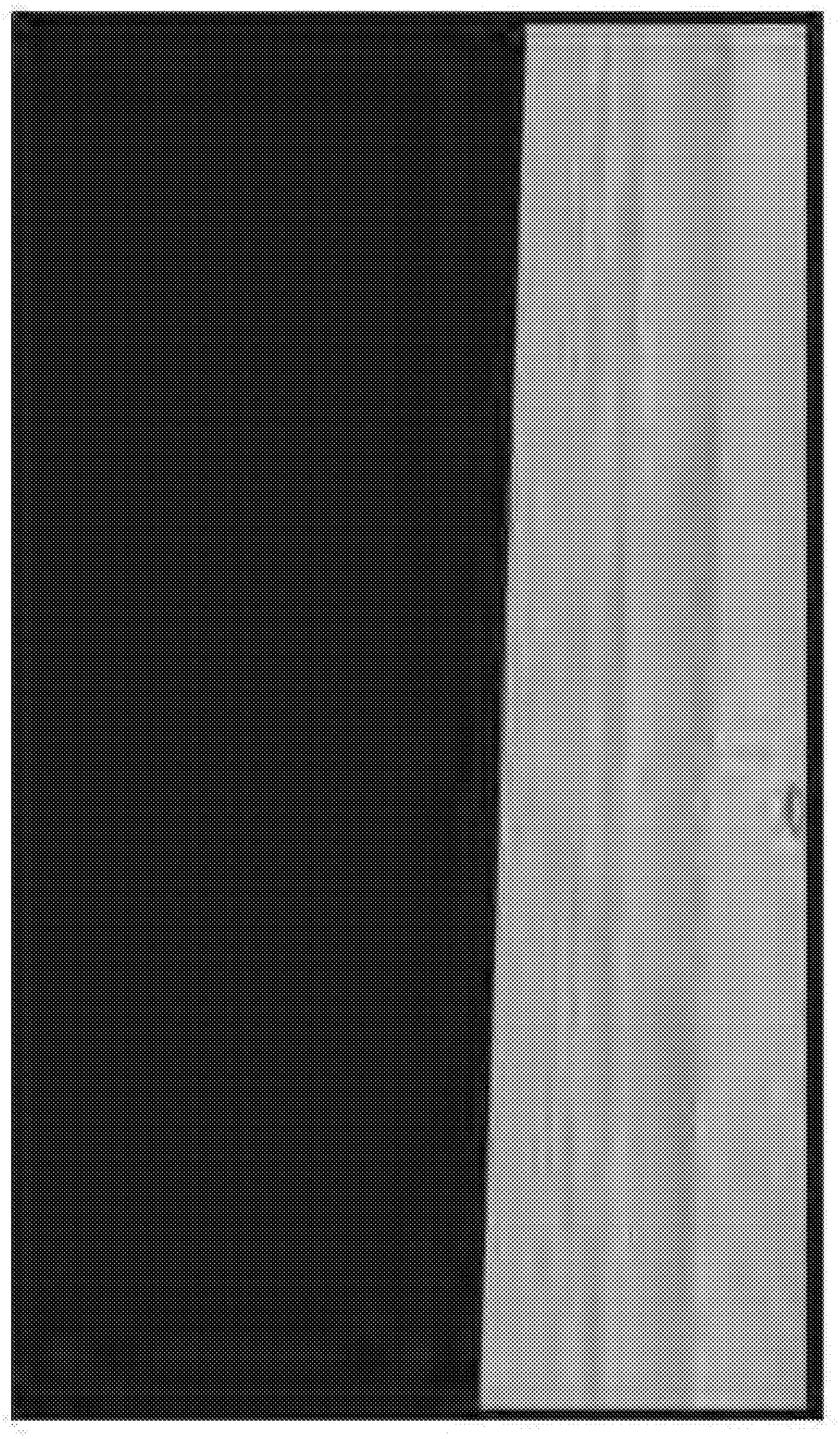
Figure 11:
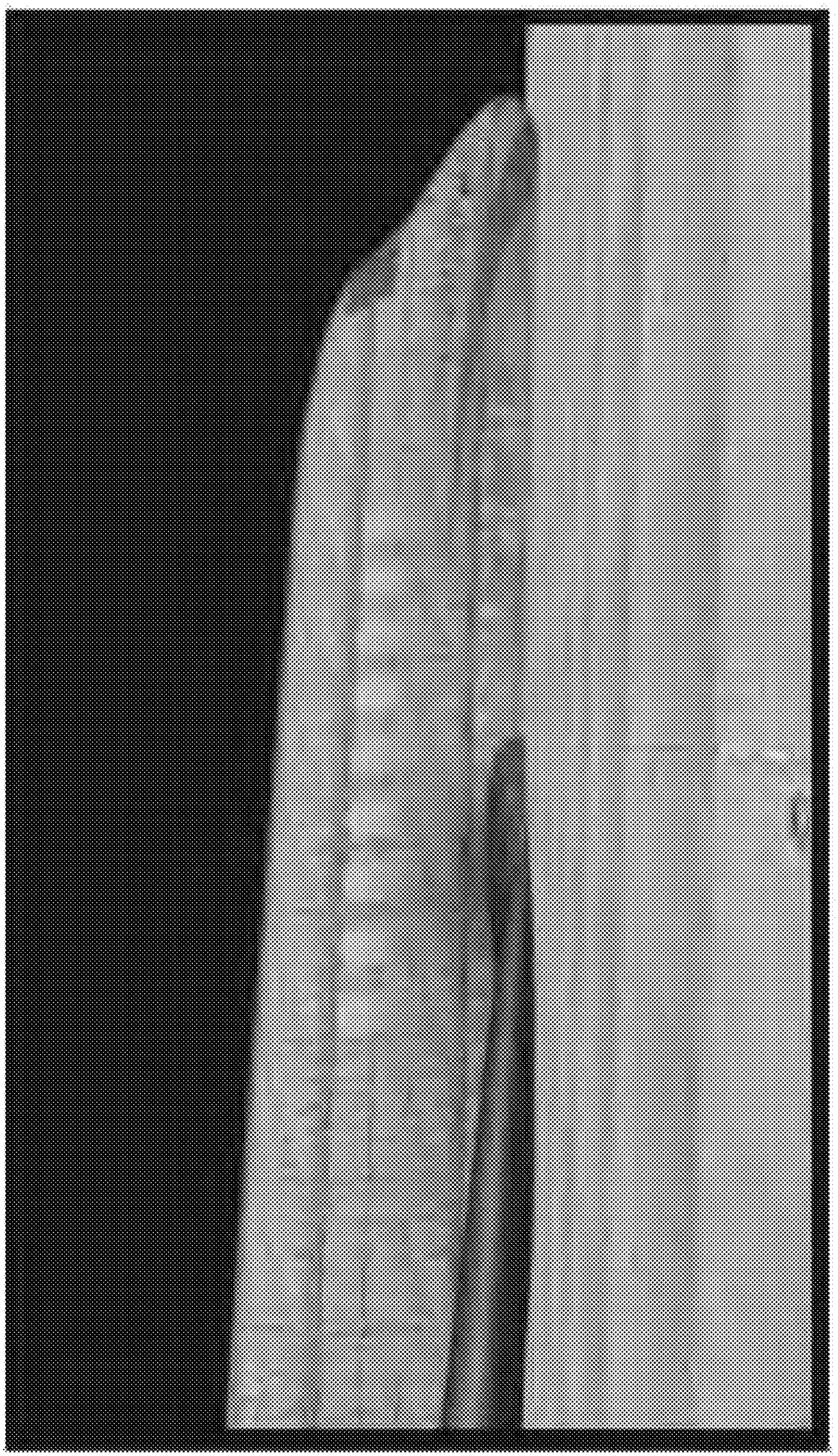

To further increase the variation of the training data, the system makes heavy uses of augmentation techniques like color augmentation (hue, saturation, brightness, contrast) as well as horizontal and vertical flipping. Besides those standard techniques the system includes a depth based composition augmentation. Since the system has access to the depth information, it is possible to combine different renderings (input and reference images) in a realistic way. FIG. 9 shows a model of an airplane. FIG. 10 shows a terrain model. FIG. 11 illustrates the augmentation of the terrain model with the airplane plane. Thus, the system mau further augment the dataset (e.g., with failure cases) in an efficient way as well as increases the dataset size due to combinatorial explosion.

2) The Neural Network

Figure 12:
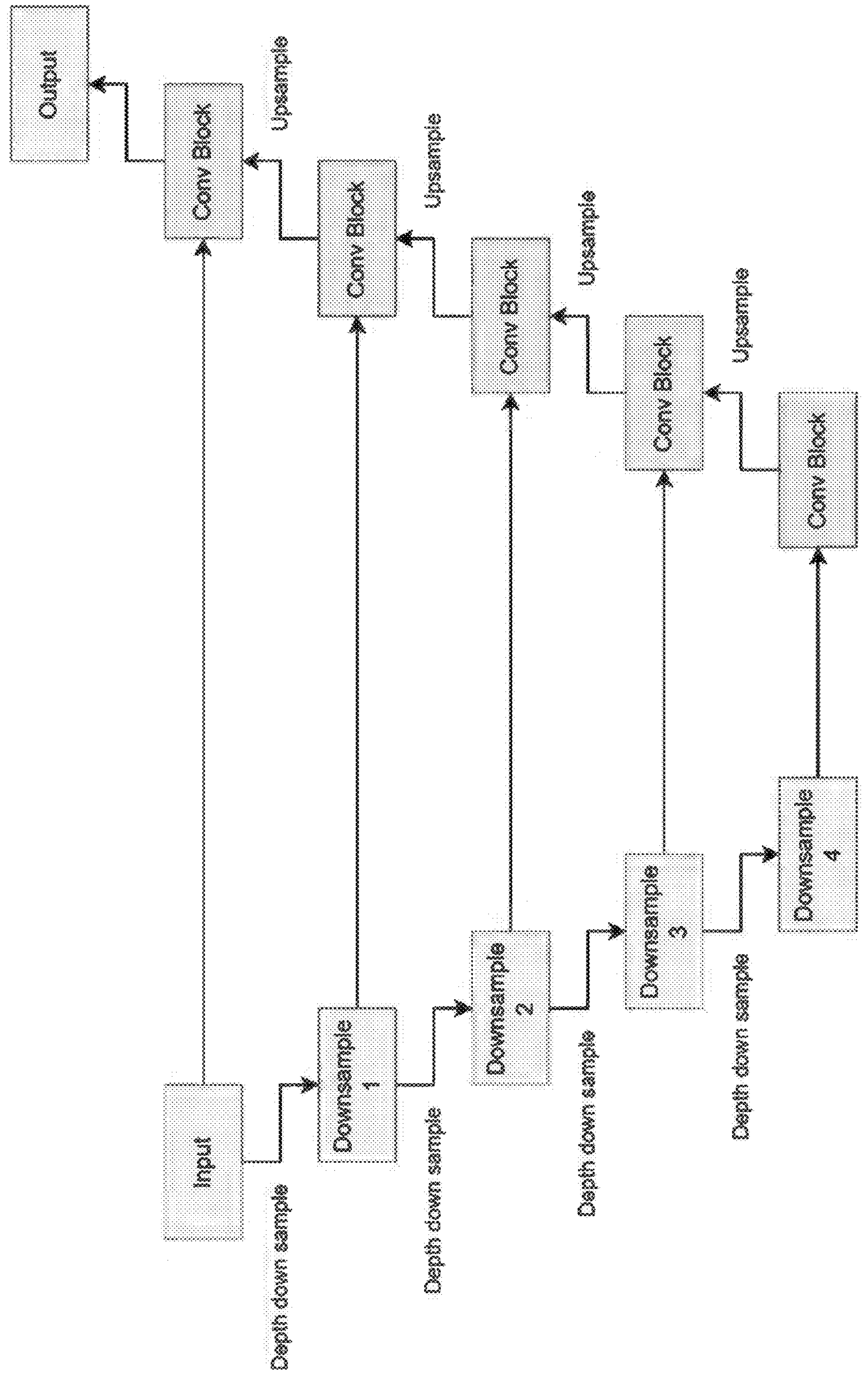

FIG. 12 illustrates the neural network. The network architecture consists of a depth based down sampling of the input image as well as a convolutional decoder. The depth down sampling selects the pixel with the depth value closest to the camera in a 2×2 patch thus reducing the resolution by half. The down sampled input is feed through a convolutional decoder consisting of five convolution blocks with two 3×3 convolution operation each, followed by a 2× nearest neighbor upsampling.

Figure 13:
Figure 14:
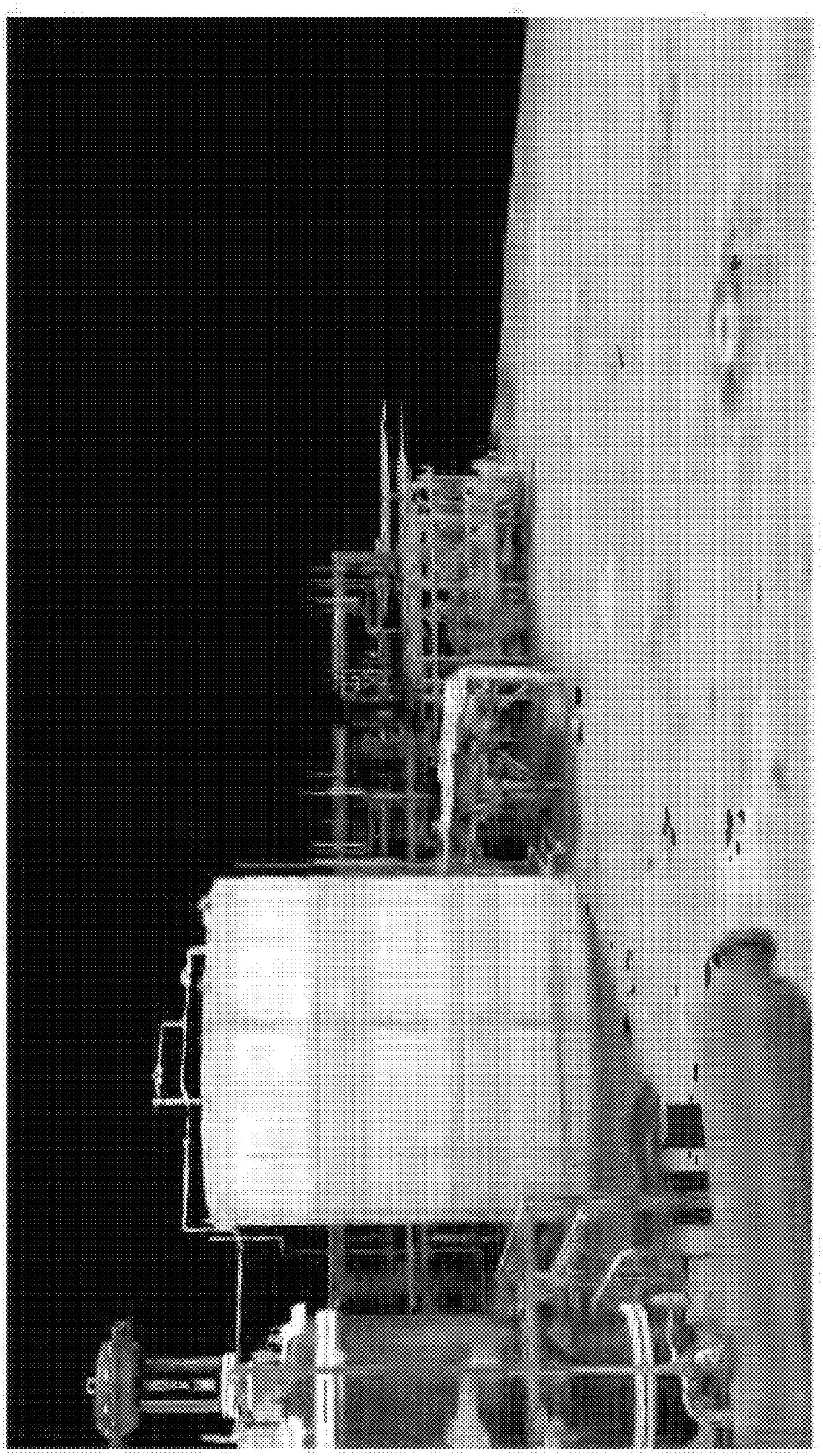

The network may be seen as a multi resolution decoder architecture. Since only the Cony Blocks contain trainable weights the network is only 3.35 MB in size and runs at 50 ms on an RTX6000 for a 1920×1080 resolution input image. FIG. 13 shows an example input. FIG. 14 shows an augmented point cloud produced by the trained neural network. IT can be noted that gaps in the ground are notably reduced.

The invention claimed is:

1. A computer-implemented method for forming a dataset configured for learning a neural network architecture, the neural network architecture being configured for inferring missing image details of a point cloud rendering, the method comprising:

obtaining a 3D mesh scene;

computing a point cloud representation of the 3D mesh scene;

generating one or more camera views of the 3D mesh scene and the point cloud representation, each camera view being generated on both the 3D mesh scene and the point cloud representation, a respective generated camera view having a position and/or orientation different from at least another generated camera view;

for each camera view:

rendering a viewpoint of the point cloud representation, thereby obtaining an image together with a corresponding depth map, rendering a viewpoint of the 3D mesh scene, computing another point cloud representation of the viewpoint of the 3D mesh scene, and rendering a viewpoint of the other point cloud representation, thereby obtaining another image together with another corresponding depth map;

obtaining a pair of training samples, each training sample comprising respectively the rendered viewpoint of the point cloud representation and the rendered viewpoint of the other point cloud representation; and adding the pair of training samples to the dataset.

2. The method of claim 1, wherein the computing the point cloud representation further comprises placing randomly one or more cube maps in the 3D scene mesh, and sampling a plurality of points of the 3D scene mesh from each of the one or more cube maps.

3. The method of claim 2, wherein the computing the point cloud representation comprises combining the points sampled from of each respective cube map.

4. The method of claim 1, wherein the 3D mesh is an interior scene, and rendering the viewpoint of the other point cloud representation further comprises, for each camera view, placing a camera in a random place of a box bounding the other point cloud representation.

5. The method of claim 4, wherein the placing of the camera is constrained by a minimum distance to a point of the other point cloud representation which is closest to the camera, and a maximum distance to any other point of the other point cloud representation.

6. The method of claim 1, wherein the 3D mesh scene is an exterior scene, and rendering the viewpoint of the other point cloud representation further comprises, for each camera view, placing a camera on a random point on a sphere bounding the other point cloud representation.

7. The method of claim 1, wherein the 3D mesh scene is a mixed scene, and rendering the viewpoint of the other point cloud representation further comprises, for each camera view, placing randomly a camera in a bounding box, the placing being constrained by a minimum distance to a point of the other point cloud representation which is closest to the camera, and a distance to a second point selected at random inside the bounding box, thereby maintaining a minimum clearance between portions and/or entities comprised in the mixed scene.

8. The method of claim 1, wherein the obtained pair of training samples is added to the dataset if a number of visible points of the rendered viewpoint of the other point cloud representation is below a predetermined threshold.

9. The method of claim 1, further comprising computing, for each pair of training samples, a combining of different renderings using the depth map.

10. The method of claim 1, further comprising applying to the pair of training samples one or more of augmentation techniques among color augmentation, horizontal and/or vertical flipping.

11. A computer-implemented method comprising:

obtaining a dataset formed according to claim 1; and learning a neural network architecture based on the dataset.

12. The method of claim 11, wherein the neural network architecture has N interconnected convolutional blocks having a respective resolution, each of the convolutional blocks being interconnected in increasing resolution, the method of use comprising providing an input image and N−1 down-sampled versions of the input image, the input image being provided to the interconnected convolutional block having the largest resolution, each down-sampled version being input to a respective convolutional blocks and having the same resolution as the respective resolution of the respective convolutional block.

13. A non-transitory computer-readable storage medium having recorded thereon a computer program that when executed by a computer causes the computer to implement a method for forming a dataset configured for learning a neural network architecture, the neural network architecture being configured for inferring missing image details of a point cloud rendering, the method comprising:

obtaining a 3D mesh scene;

computing a point cloud representation of the 3D mesh scene;

generating one or more camera views of the 3D mesh scene and the point cloud representation, each camera view being generated on both the 3D mesh scene and the point cloud representation, a respective generated camera view having a position and/or orientation different from at least another generated camera view;

for each camera view:

rendering a viewpoint of the point cloud representation, thereby obtaining an image together with a corresponding depth map, rendering a viewpoint of the 3D mesh scene, computing another point cloud representation of the viewpoint of the 3D mesh scene, and rendering a viewpoint of the other point cloud representation, thereby obtaining another image together with another corresponding depth map;

obtaining a pair of training samples, each training sample comprising respectively the rendered viewpoint of the point cloud representation and the rendered viewpoint of the other point cloud representation; and adding the pair of training samples to the dataset.

14. A system comprising:

a processor coupled to a memory, the memory having recorded thereon a computer program for forming a dataset configured for learning a neural network architecture, the neural network architecture being configured for inferring missing image details of a point cloud rendering, that when executed by the processor causes the processor to be configured to:

obtain a 3D mesh scene;

compute a point cloud representation of the 3D mesh scene;

generate one or more camera views of the 3D mesh scene and the point cloud representation, each camera view being generated on both the 3D mesh scene and the point cloud representation, a respective generated camera view having a position and/or orientation different from at least another generated camera view;

for each camera view:

render a viewpoint of the point cloud representation, thereby obtaining an image together with a corresponding depth map, render a viewpoint of the 3D mesh scene, compute another point cloud representation of the viewpoint of the 3D mesh scene, and render a viewpoint of the other point cloud representation, thereby obtaining another image together with another corresponding depth map;

obtain a pair of training samples, each training sample comprising respectively the rendered viewpoint of the point cloud representation and the rendered viewpoint of the other point cloud representation; and add the pair of training samples to the dataset.

15. The method of claim 2, wherein the 3D mesh is an interior scene, and rendering the viewpoint of the other point cloud representation further comprises, for each camera view, placing a camera in a random place of a box bounding the other point cloud representation.

16. The method of claim 3, wherein the 3D mesh is an interior scene, and rendering the viewpoint of the other point cloud representation further comprises, for each camera view, placing a camera in a random place of a box bounding the other point cloud representation.

17. The method of claim 2, wherein the 3D mesh scene is an exterior scene, and rendering the viewpoint of the other point cloud representation further comprises, for each camera view, placing a camera on a random point on a sphere bounding the other point cloud representation.

18. The method of claim 3, wherein the 3D mesh scene is an exterior scene, and rendering the viewpoint of the other point cloud representation further comprises, for each camera view, placing a camera on a random point on a sphere bounding the other point cloud representation.

19. The method of claim 4, wherein the 3D mesh scene is an exterior scene, and rendering the viewpoint of the other point cloud representation further comprises, for each camera view, placing a camera on a random point on a sphere bounding the other point cloud representation.

20. The method of claim 5, wherein the 3D mesh scene is an exterior scene, and rendering the viewpoint of the other point cloud representation further comprises, for each camera view, placing a camera on a random point on a sphere bounding the other point cloud representation.

* * * * *